United States Patent [19]

Zengel et al.

[11] 4,357,447

[45] Nov. 2, 1982

[54] POLYMERE N-HALOGENAMIDE AUF BASIS VON ACRYL-UND METHACRYLAMID

[75] Inventors: Hans-Georg Zengel, Kleinwallstadt; Manfred Bergfeld, Erlenbach, Mechenhard; Rainer Zielke, Erlenbach, all of Fed. Rep. of Germany

[73] Assignee: Akzo NV, Arnhem, Netherlands

[21] Appl. No.: 131,368

[22] Filed: Mar. 18, 1980

[30] Foreign Application Priority Data

Aug. 13, 1979 [DE] Fed. Rep. of Germany ....... 2931572

[51] Int. Cl.$^3$ ............................................... C08F 8/22
[52] U.S. Cl. ................................. 525/329.4; 525/358; 526/292.95; 260/543 A
[58] Field of Search ................................ 525/336, 358

[56] References Cited

U.S. PATENT DOCUMENTS 2,729,560  1/1956  House et al. ................... 526/303
4,301,257  11/1981  Zengel et al. .................. 525/336

FOREIGN PATENT DOCUMENTS 579222  7/1959  Canada .
2545984  5/1976  Fed. Rep. of Germany .

*Primary Examiner*—William F. Hamrock
*Attorney, Agent, or Firm*—Michael J. Striker

[57] ABSTRACT

Polyfunctional N-chloramide derivatives of homo-or copolymers of acrylamide or methacrylamide. These may be copolymers of methacrylamide and acrylamide; or of either of these with any of styrene, methylstyrene, dimethylstyrene, chlorostyrene and alkylacrylate. Preferred alkylacrylate include methyl-, methylmeth-, ethyl-, ethylmethyl-, butylmeth-, hexyl-, hexylmeth-, decyl-, decylmeth-, dodecyl- and dodecylmeth- species. The derivatives may be cross-linked by divinylbenzene or divinylether.

4 Claims, No Drawings

POLYMERE N-HALOGENAMIDE AUF BASIS VON ACRYL-UND METHACRYLAMID

The present invention relates to polyfunctional N-chloramide derivatives of homo- or copolymers of acrylamide or methacrylamide, particularly N-chloramide derivatives of polyacrylamide, polymethacrylamide, of copolymers of methacrylamide or acrylamide and styrene, methylstyrene, dimethylstyrene, chlorstyrene and/or alkylacrylate, preferably methylacrylate, methylmethacrylate, ethylacrylate, ethylmethacrylate, butylacrylate, butylmethacrylate, hexylacrylate, hexylmethacrylate, decylacrylate, decylmethacrylate, dodecylacrylate and dodecylmethacrylate as well as the products of these polymers and copolymers which have been cross-linked by conventional cross-linking agents such as divinylbenzene and divinylether. These compounds are mentioned in the German published application No. 25 45 984 as intermediate products in the synthesis of amide polymers which include functional isocyanate residues, by means of the Hofmann degradation of polymers on the basis of acrylamide and methacrylamide by means of sodium hypochlorite. In the German published application No. 25 45 985 it is asserted that the chloramide which forms in the Hofmann degradation of the amide polymer as intermediate product and is present as chloramide in the form of its sodium salt may be isolated from the reaction mass by acidifying with a mineral acid. This assertion, however, is rebutted by the examples of the German application No. 25 45 984. According to Example 13 the chlorination of the amide polymer with sodium hypochloride was carried out at comparatively low temperatures (3 to 7° C.). It could be assumed that under these conditions the reaction stops at the stage of the N-chloramide. However, in reality there is formed the isocyanate. This is shown by IR analyses. They show that the isocyanate content at low temperature is almost as high as at the higher temperatures after completion of the reaction. In Example 20 of the German application 25 45 984 the time sequence of the chlorination of the amide polymers at 0 to 5° C. is traced by obtaining several IR spectra after acidifying the reaction mixture. In this case neither isocyanate nor N-chloramide salt could be found. Also free N-chloramide could not be determined and certainly not be isolated. The own comparative tests of the applicants have moreover shown without doubt that this isocyanate is formed immediately. It must be assumed that at low chlorination temperatures with sodium hypochloride no N-chloramide is formed at all and that at higher chlorination temperatures the isocyanate is immediately formed. It is therefore a fact that the N-chloramides listed in the German application No. 25 45 984 so far could not be gotten hold of as compounds. Besides, so far there was no other process available to form the compositions which in the German application No. 25 45 984 are designated N-chloramide of amide polymers on the basis of acrylamide and methacrylamide. The applicant therefore is the first to have succeeded to make the polyfunctional N-chloramide derivatives of homo- or copolymers of acrylamide or methacrylamide of the invention.

In case of the amide groups containing polymers of the invention, about 20 to 100% of the amide groups are converted to N-chloramide groups. The contents of N-chloramide groups was determined by means of the titration with potassium iodide/sodium thiosulfate which is further described in Example 1. The content of N-chloramide groups depends on the type of starting polymers and the degree of chlorination. For instance, in case of quantitative chlorination of a copolymer with a 10% by weight portion of methacrylamide a polymeric N-chloramide with a chorine content of 4% by weight, and with a homopolymeric methacrylamide a polymeric N-chloramide with a chlorine content of 29.7 by weight must be expected. In case of lower degrees of chlorination there are of course also present amide groups in addition to the N-chloramide groups.

The polymeric N-chloramides are almost insoluble in water and aqueous mineral acids, but have good solubility in organic solvents such as halogenated hydrocarbons. The process of the invention for making polyfunctional N-chloramide derivatives of homo- or copolymers of acrylamide or methacrylamide is characterized by the feature that a homo- or copolymer of acrylamide or methacrylamide is chlorinated by means of chlorine in an aqueous suspension of a mineral acid at temperatures between 0 and 40° C. It must be considered surprising that under these conditions a product is selectably formed with a higher or lower N-chloramide content. It is noteworthy that these products do not contain N-dichloramide groups. Since the chlorination is carried out in an acidic medium the products furthermore do not contain isocyanate- or amino groups formed by a Hofmann degradation nor do they contain compounds with urea bridges formed by secondary reactions.

Amide groups containing polymers which are useful for forming the polyfunctional N-chloramide derivatives and of which some have already been described in the German published application No. 25 45 984 are the following: polyacrylamide, polymethacrylamide, copolymer from methacrylamide or acrylamide and styrene, methylstyrene, dimethylstyrene, chlorostyrene and alkylacrylates as e.g. methylacrylate, methylmethacrylate, ethylacrylate, ethylmethacrylate, butylacylate, butylmethacrylate, hexylacrylate, hexylmethacrylate, decylacrylate, decylmethacrylate, dodecylacrylate and dodecylmethacrylate, as well as the products of these polymers and copolymers which have been cross-linked by conventional cross-linking agents such as divinylbenzene and divinylether. The homo- and copolymers employed contain 5 to 100 mol % of acryl- or methacrylamide. The molecular weight distribution of the homo- and copolymerizates is of a broad range. The mean molecular weight can vary from 1000 to 10,000; preferably polymers are used with a mean molecular weight from 5000 to 10,000. The cross-linked starting polymers can be cross-linked for instance with 1 to 10 mol % of a divinyl compound.

The chlorination of the amide groups containing homo- and copolymers is preferably carried out by means of chlorine in an aqueous suspension of a mineral acid at temperatures from 0 to 40° C. As aqueous mineral acid there are particularly suited dilute aqueous hydrochloric acid, sulfuric acid and phosphoric acid. Preferably one starts with an aqueous suspension of the amide groups containing polymers in a dilute hydrochloric acid or dilute sulfuric acid. The chlorination has an exothermic development and is preferably carried out at temperatures between 0° and 30° C. The use of higher temperatures than 40° C. is undesirable because considerable amounts of carboxylic groups are formed by hydrolysis. The chlorination can be carried out either at atmospheric pressure or at an elevated pressure. With increasing pressure the necessary reaction time is reduced. The preferred pressure range is, however, between 1 and 6 bar for economic reasons. Since the chlorination is carried out in a heterogeneous phase the suspension must be subjected to a thorough mixing. The dilution of the reaction mixture should at least be such that the mass can be stirred without difficulties or mixed in some other way. The preferred dilution of the initial reaction mixture is about 100 to 200 g amide-group-containing polymers per liter of water or aqueous mineral acid. If these conditions are observed the chlorination is complete after about 0.25 to 2 hours. Depending on the condition of the amide-group-containing polymers about 20 to 100% of the amide groups are converted under these conditions to N-chloramide groups. The suspension which is formed after completion of the chlorination contains only the modified polymers as solid. The solid can be separated in simple manner by filtering off or centrifuging. Separation of the polymeric N-chloramides is also possible by extraction. As extraction agents there may be used halogenated hydrocarbons and aromatic products such as methylene chloride, chloroform, carbontetrachloride, ethylenetetrachloride, benzene, toluene and xylene.

The polyfunctional N-chloramide derivatives of homo- or copolymers of acrylamide or methacrylamide are highly useful products. They can be converted to the corresponding polyfunctional isocyanate derivatives in a simple manner according to the process of the German published application P No. 28 41 713.2 by reaction with a tertiary amine with a $pK_a$-value of more than 7 in the presence of an inert solvent and a temperature in the range between 20° and 180° C. The isocyanate derivatives are useful starting products for making coating materials.

EXAMPLE 1

10 g of a copolymer of 10 parts methacrylamide, 50 parts methylmethacrylate and 40 parts butyacrylate were dispersed in 100 g of a 5% hydrochloric acid. Subsequently chlorine was passed through the mass for 4 hours at 15° to 20° C. After stripping off the excess chlorine by means of nitrogen, the polymeric N-chloramide was recovered by suction, washed neutral with distilled water and dried at 35° C. in a vacuum (30 mbar).

There were obtained 10.35 g of polymeric N-chloramide with an active chlorine content of 4.0%, that is 100% of the amide groups of the polymer had been converted into the chloramide.

The contents of active chlorine were determined as follows:

A specimen of 0.5 to 1 g of polymeric N-chloramide was used depending on the chlorine contents of the polymer. There were then added 20 ml of an acetic acid-chloroform mixture (3:2 volume parts) and 1 ml of a saturated potassium iodide solution. After an hour the mass was diluted with 30 ml water and titrated with 0.1 n sodium thiosulfate solution and starch as indicator. The active chlorine content was determined by the formula $$\% \text{ chlor} = \frac{177.5 \cdot a}{b}$$

in which
a = ml used up 0.1 n sodiumthiosulfate, and
b = mg weight amount of polymeric N-chloramide.

EXAMPLE 2

10 g of a copolymer of 20 parts of methacrylamide, 40 parts of methylmethacrylate and 40 parts of butylacrylate were chlorinated in 100 g of a 5% hydrochloric acid at a chlorine pressure of 4 bar at 20° C. and a period of 30 minutes. The isolation of the N-chloramide was effected as in Example 1. There were obtained 10.35 g of polymeric N-chloramide with an active chlorine content of 6.4%, that is 83% of the amide groups had been chlorinated.

EXAMPLE 3

10 g of a copolymer of the same composition as in Example 2 were chlorinated in 100 g of a 2% sulfuric acid with the chlorine pressure of 2 bar at 20° C. temperature and for a time of 60 minutes. There were obtained 10.3 g of polymeric N-chloramide with an active chlorine content of 6.2%, that is 80.5% of the amide groups had been chlorinated.

EXAMPLE 4

10 g of a copolymer of 30 parts methacrylamide, 30 parts of methylacrylate and 40 parts of butylacrylate were suspended in 100 g of a 5% hydrochloric acid. Chlorine was passed through the suspension at 10° C. for 3 hours. Thereafter excess chlorine was driven off with nitrogen and the suspension was twice extracted with 100 ml methylenechloride each. The separated organic phases were concentrated to dryness which resulted in 10.7 g of a polymeric N-chloramide with an active chlorine content of 9.6%, that is 86% of the amide groups had been chlorinated.

EXAMPLE 5

10 g of a copolymer of 10 parts methacrylamide and 90 parts decylacrylate were chlorinated in the same manner as in Example 4. The suspension was then extracted twice with 100 ml toluene each and the solvent was distilled off in a vacuum. There were obtained 10.2 g of polymeric N-chloramide with an active chlorine content of 3%, that is 75% of the amide groups had been chlorinated.

EXAMPLE 6

10 g of a polymethacrylamide which had been crosslinked with 5% divinylbenzene were chlorinated in 100 ml of a 5% hydrochloric acid as in Example 1 and separated from the reaction mixture. There were obtained 12.2 g of a polymeric cross-linked N-chloramide with an active chlorine content of 17%, that is 60% of the amide groups had been chlorinated.

EXAMPLE 7

10 g of a copolymer of 20 parts acrylamide and 80 parts of methylmethacrylate were chlorinated as described in Example 2. There were obtained 10.5 g of a polymeric N-chloramide with an active chlorine content of 7.7%, that is 84.5% of the amide group had been chlorinated.

Reproduction of Example 20 of the German published application No. 25 45 984

A copolymer of 15% by weight of methacrylamide and 85% by weight of butylmethacrylate was chlorinated in a 12.5% NaOCl solution at a molar ratio of amide to NaOCl of 1:3 and at a temperature of 0° to 5° C. The mass was then acidified with hydrochloric acid without further heating, The organic phase was separated and the remaining resin was analyzed by IR spectrography with after drying of the solvent.

As stated in German application 25 45 984 the IR spectrum of the resins did not contain any isocyanate bands.

The statements in the German published application No. 25 45 985 to the effect that in the reaction of the polymeric amide with hypochlorite described there is formed chloramide and that it could also be separated is, however, incorrect. This can be proven experimentally as follows: According to Example 3 of the German Patent application P No. 28 41 713.2 and the there described process for making isocyanates from N-chloramide in the presence of an inert solvent and a tertiary amine there were reacted 10 g of the resin obtained by the process of Example 20 of the German application No. 25 45 984 with 4 g of triethylamine in 150 ml toluene. The IR analysis of the reaction product showed that there was no isocyanate present. If, in the reaction according to Example 20 of the German application No. 25 45 984 polymeric N-chloramide had been formed, this should have been converted in the further reaction according to Example 3 of German application P 28 41 713.2 into a polymeric isocyanate. On the other hand N-chloramide of the present invention formed by chlorination of a copolymer of 15% by weight of methacrylamide and 85% by weight of butylmethacrylate with a chlorine content of 4.5% could be converted smoothly under the same conditions as in the process of German application P No. 28 41 713.2 to a polyisocyanate with an NCO-content of 3.5%.

To exclude the possibility that in reproducing Example 20 of the German application No. 25 45 984 an error may have occurred, the making of the resin there described as "Charge C" assumed to have an NCO content of 2.66% was also reproduced. In this case there was actually a polymeric isocyanate obtained with an NCO content of 2.60% which confirmed that the reproduction had been carried out correctly.

We claim:

1. Polyfunctional N-chloramide derivatives of homo- or copolymers of acrylamide or methacrylamide having mean molecular weight from 1000 to 10,000.

2. The polyfunctional N-chloramide derivatives of claim 1 which are copolymers of
   (1) methacrylamide and acrylamide or
   (2) methacrylamide or acrylamide and one or several of the following: styrene, methylstyrene, dimethylstyrene, chlorostyrene or an alkylacrylate.

3. The polyfunctional N-chloramide derivatives of claim 2 in which the alkylacrylate is methylacrylate, methylmethacrylate, ethylacrylate, ethylmethylacrylate, butylacrylate, butylmethacrylate, hexylacrylate, hexylmethacrylate, decylacrylate, decylmethacrylate, dodecylacrylate or dodecylmethacrylate.

4. The polyfunctional N-chloramide derivatives of claim 1 which are cross-linked by divinylbenzene or divinylether.

* * * * *